(12) United States Patent
Sparkman

(10) Patent No.: US 9,488,128 B2
(45) Date of Patent: Nov. 8, 2016

(54) THERMAL TORQUE ENGINE

(71) Applicant: Scott Sparkman, Honolulu, HI (US)

(72) Inventor: Scott Sparkman, Honolulu, HI (US)

( * ) Notice: Subject to any disclaimer, the term of this patent is extended or adjusted under 35 U.S.C. 154(b) by 0 days.

(21) Appl. No.: 14/062,529

(22) Filed: Oct. 24, 2013

(65) Prior Publication Data

US 2015/0113973 A1 Apr. 30, 2015

(51) Int. Cl.

| F02G 1/04 | (2006.01) |
|---|---|
| F02G 1/02 | (2006.01) |
| F01D 15/10 | (2006.01) |
| F03G 6/00 | (2006.01) |
| F03G 7/04 | (2006.01) |

(52) U.S. Cl.
CPC .............. *F02G 1/02* (2013.01); *F01D 15/10* (2013.01); *F03G 6/00* (2013.01); *F03G 6/003* (2013.01); *F03G 7/04* (2013.01); *F02G 2254/00* (2013.01); *F02G 2255/20* (2013.01); *Y02E 10/28* (2013.01)

(58) Field of Classification Search
CPC .. F02G 1/02; F02G 2255/20; F02G 2254/00; F01D 15/10; F01K 25/04; F01K 25/00; F01K 27/00; F01K 27/02; F01K 27/005
USPC .......................................... 60/527, 516, 530
See application file for complete search history.

(56) References Cited

U.S. PATENT DOCUMENTS

| 243,909 | A | * | 7/1881 | Iske et al. ........................ 60/675 |
| 4,121,420 | A | * | 10/1978 | Schur ............................... 60/531 |
| 4,143,517 | A | * | 3/1979 | Compton ......................... 60/675 |
| 4,589,259 | A | * | 5/1986 | Boutto et al. ................... 60/698 |
| 7,131,270 | B2 | * | 11/2006 | Bittner ...................... F03G 7/06 60/531 |
| 8,539,765 | B2 | * | 9/2013 | Miller ............................. 60/531 |
| 2005/0140180 | A1 | * | 6/2005 | Hesch ................. B60R 21/0428 296/208 |
| 2013/0000303 | A1 | * | 1/2013 | Godwin .......................... 60/660 |

OTHER PUBLICATIONS

P.C.T. International Search Report for P.C.T. Application No. PCT/US2014/062204 by the U.S. Patent and Trademark Office (ISA/US).

* cited by examiner

*Primary Examiner* — Thomas Denion
*Assistant Examiner* — Kelsey Stanek
(74) *Attorney, Agent, or Firm* — Michael I. Kroll; Edwin D. Schindler

(57) ABSTRACT

A thermal torque engine comprising a hot box heated by a thermal agent and a wheel having a plurality of peripherally mounted canisters with diametrically opposed canisters connected by a conduit. One of the pair of canisters having a quantity of refrigerant that is pressurized when within the hot box. The pressurized refrigerant moves to the cooler canister with the process continuing for subsequent paired canisters as long as there is a predetermined thermal difference between the interior and exterior of the hot box.

12 Claims, 13 Drawing Sheets

THERMAL TORQUE ENGINE

BACKGROUND OF THE INVENTION

1. Field of the Invention

The present invention relates generally to engines and, more specifically, to a thermal torque engine comprising a heated enclosure, hereinafter referred to as a hot box, and a wheel that is partially enclosed within the hot box having a plurality of arrayed canisters with diametrically opposed canister in conduit communication. Substantially half of the canisters contain a refrigerant material so that when a canister passes into the hot box, the refrigerant is heated wherethen the pressurized refrigerant moves to its conjoined canister outside of the hot box causing the wheel to turn by virtue of the thermal fluid transfer, gravity and imbalanced transfer of weight wherethen the cooler refrigerant enters the heated box thereby again heating the refrigerant that moves to the cooler canister with this process continuing as long as there is a predetermined thermal difference between the inside and outside of the thermal box. The present invention further provides that naturally occurring thermal energy is used as the thermal agent to increase the temperature within the hot box. Additionally the present invention provides for alternate fuel sources, such as, wood, gas, propane, etc.

2. Description of the Prior Art

There are other engines which provide for harvesting naturally occurring renewable energy. While these engines may be suitable for the purposes for which they where designed, they would not be as suitable for the purposes of the present invention as heretofore described.

It is thus desirable to provide an engine having a plurality of diametrically conjoined canisters, one having a predetermined amount of refrigerant therein, fastened to a wheel with a portion of the wheel enclosed by a hot box so that the temperature difference between the interior and exterior of the box pressurizes the refrigerant causing the refrigerant to move from the canister within the box through conduit to the canister outside the box resulting in a weight differential/imbalance creating torque causing the wheel to incrementally turn in repetitive fashion as each of the canisters is driven between the heat laden hot box and the cooler exterior ambient temperature.

It is further desirable to preferably use naturally occurring thermal energy to heat a thermal agent that is channeled through the hot box creating a temperature difference needed to pressurize the canister refrigerant. The temperature difference within the hot box can also be generated through alternate fuel sources, such as wood, gas and propane.

SUMMARY OF THE PRESENT INVENTION

A primary object of the present invention is to generate electricity through a thermal torque engine.

Another object of the present invention is to provide a thermal torque engine comprising an enclosure that is heated by a thermal agent and a wheel having a plurality of peripherally mounted canisters with diametrically opposed canisters connected by conduit with one of the pair having a quantity of refrigerant that is pressurized when within the hot box, with the pressurized refrigerant moving to the cooler canister with the process continuing for subsequent paired canisters as long as there is a predetermined thermal difference between the interior and exterior of the hot box.

Yet another object of the present invention is to provide a thermal torque engine wherein diametrically opposed canisters connected by conduit is a set of fluidly connected canisters on each end of a common conduit.

Still yet another object of the present invention is to provide a thermal torque engine further comprising an alternator/generator driven through a mechanical linkage between said wheel and said alternator/generator.

An additional object of the present invention is to provide a thermal torque engine that uses thermal energy to heat a thermal agent that is channeled through the thermally insulated hot box to create a heated environment for pressurizing a canister's refrigerant.

A further object of the present invention is to provide a thermal torque engine wherein the thermal energy is selected from naturally occurring thermal energy.

A yet further object of the present invention is to provide a thermal torque engine wherein said thermal channeling agent is selected from water, glycol or oil.

A still yet further object of the present invention is to provide a thermal torque engine wherein said hot box provides slotted apertures allowing movement of the spoked wheel therethrough.

Another object of the present invention is to provide a thermal torque engine wherein said hot box provides tensioned gated slots fastened to said slotted apertures allowing the wheel to push through a gated slot with the tensioned gate closing, by virtue of the tensioning member, once the wheel passes through the gated slot thereby minimizing thermal energy loss through the slotted aperture.

Yet another object of the present invention is to provide a thermal torque engine wherein said hot box provides brush-like members or cloth fastened to said slotted apertures allowing the wheel slats to pass through the brush bristles thereby minimizing thermal energy loss through the slotted aperture.

Additionally, a collar gasket ring is positioned at the center of the wheel so that the collar gasket ring rides close to the hot box preventing heat loss.

Still yet another object of the present invention is to provide a thermal torque engine wherein said hot box optionally provides a radiator channeling a thermal agent imbued with thermal energy as a heat source for heating said hot box.

A further object of the present invention is to provide a thermal torque engine wherein said canister optionally provides surface enhancement, such as fins or ribbing, to dissipate and absorb the canisters thermal energy.

A yet further object of the present invention is to provide a thermal torque engine wherein said wheel optionally provides weights fastened to the periphery to increase torque as the wheel turns.

A still yet further object of the present invention is to provide a thermal torque engine that uses naturally occurring thermal energy to heat a thermal agent that is channeled through the hot box to heat the hot box.

Another object of the present invention is to provide a thermal torque engine that uses alternate fuels, such as wood, gas and propane to heat a thermal agent channeling through the hot box.

Additional objects of the present invention will appear as the description proceeds.

The present invention overcomes the shortcomings of the prior art by providing a thermal torque engine having a heated hot box, and a wheel that is partially encompassed by the hot box with a plurality of arrayed diametrically opposed canister(s) in conduit communication whereby a refrigerant material movable between the canisters is pressurized within the hot box with the pressurized refrigerant moving to its conjoined canister(s) outside of the hot box causing the wheel to turn by virtue of the thermal fluid transfer and the weight imbalance caused by the fluid transfer. The cooler refrigerant re-enters the heated box thereby again heating the refrigerant that moves to the cooler canister with this process continuing as long as there is a predetermined thermal difference between the inside and outside of the thermal box.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
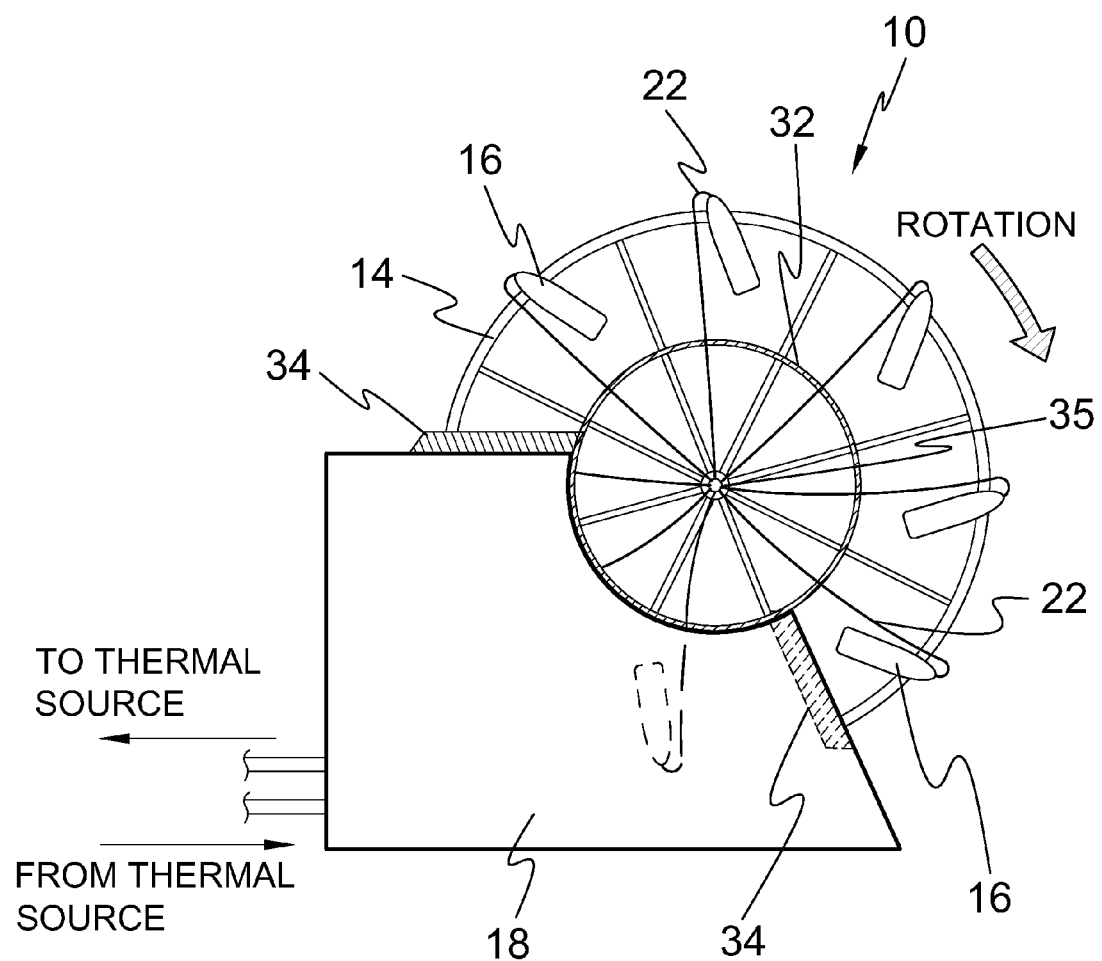
FIG. 1 is an illustrative view of the thermal torque engine of the present invention.

Turning now descriptively to the drawings, in which similar reference characters denote similar elements throughout the several views, the Figures illustrate the thermal torque engine of the present invention. With regard to the reference numerals used, the following numbering is used throughout the various drawing figures.

10 thermal torque engine
12 alternator/generator
14 wheel of engine 10
16 canister of engine 10
18 hot box of engine 10
20 refrigerant of engine 10
22 conduit of engine 10
24 hot water panel
26 insulated storage tank
28 heat pump
30 radiator in hot box 18
32 collar ring gasket
34 flap door on hot box 18
35 axle
36 fin on canister 16
37 belt drive
38 capacitor/battery
40 grid inverter
42 pulley
44 weight on wheel 14
46 housing of 16
48 cover of 46
50 chambers of 46
51 ribbing
52 conduit aperture of 46
54 sliding fin channel of 46
56 sliding fin/structural supports of 46

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1 is an illustrative view of the torque engine of the present invention. The present invention is a torque engine 10 using thermal energy and gravity to create torque, which can be used as motive force to drive an electricity generating device, such as, an alternator or generator 12. The torque engine 10 comprises a wheel 14 having a plurality of opposingly mated canisters 16 and a hot box 18 that partially encloses a portion of the wheel 14 with the enclosed portion of the hot box 18 creating a temperature difference between the wheel bound canisters 16 within the enclosed portion of the hot box 18 and those outside the hot box 18 causing a working fluid (refrigerant or similar fluids) 20 within the hot box 18 to pressurize then move through a conduit 22 to its opposing canister 16, whereby as the canister 16 becomes heavier due to the entering cooling liquid refrigerant 20. The wheel 14 incrementally moves creating torque in repetitive fashion as each of the canisters 16 is driven between the heat laden hot box 18 and the cooler exterior ambient temperature.

Figure 2:
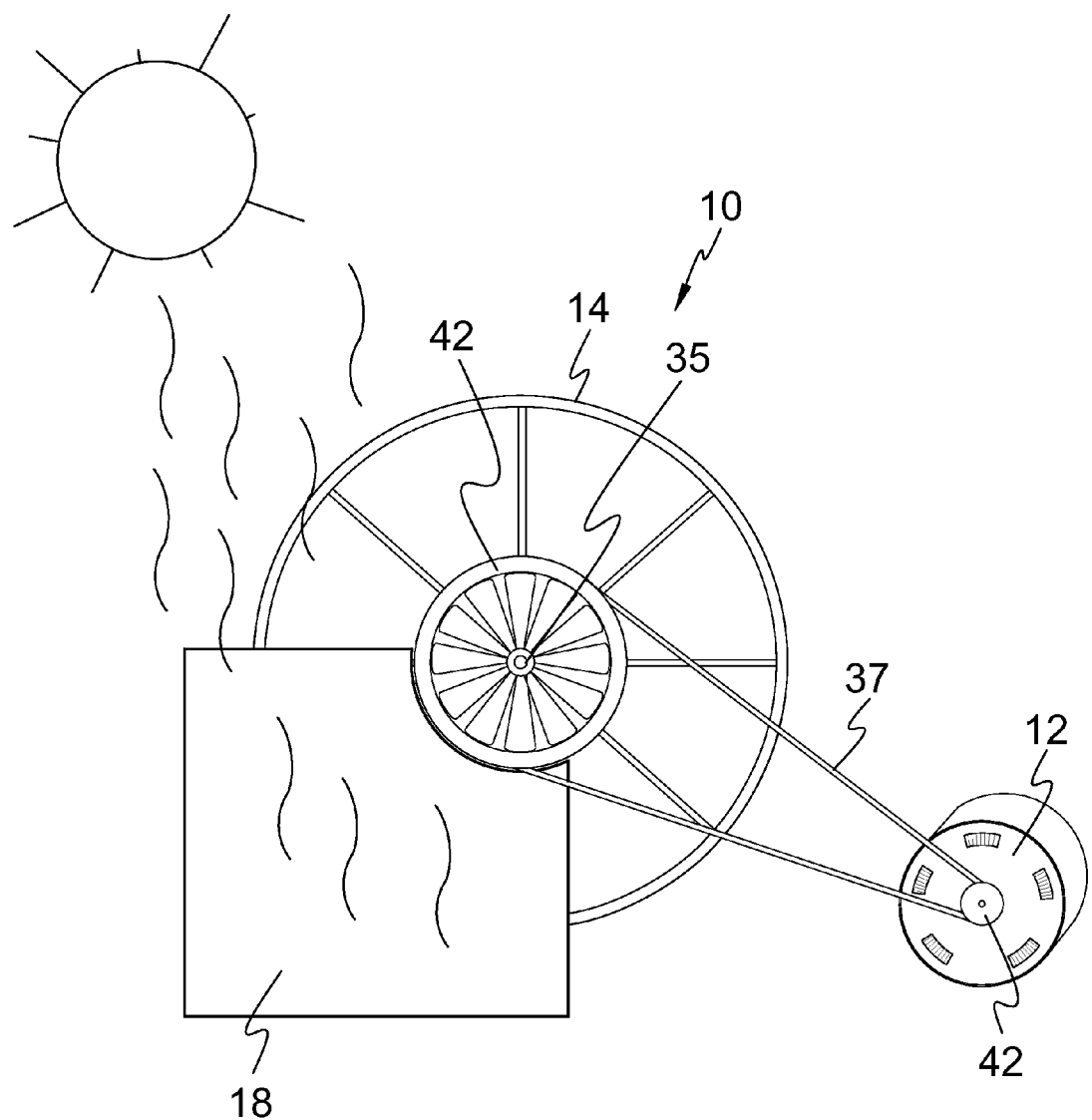
FIG. 2 is an illustrative view of an enablement of the thermal torque engine of the present invention.

Referring to FIG. 2 is an illustrative view of an enablement of the torque engine of the present invention. Shown is an enablement of the torque engine 10 using naturally occurring thermal energy to heat the substantially enclosed space of the hot box 18, thereby creating a temperature difference between the canisters 16 within the hot box 18 and those outside of the hot box 18.

Figure 3:
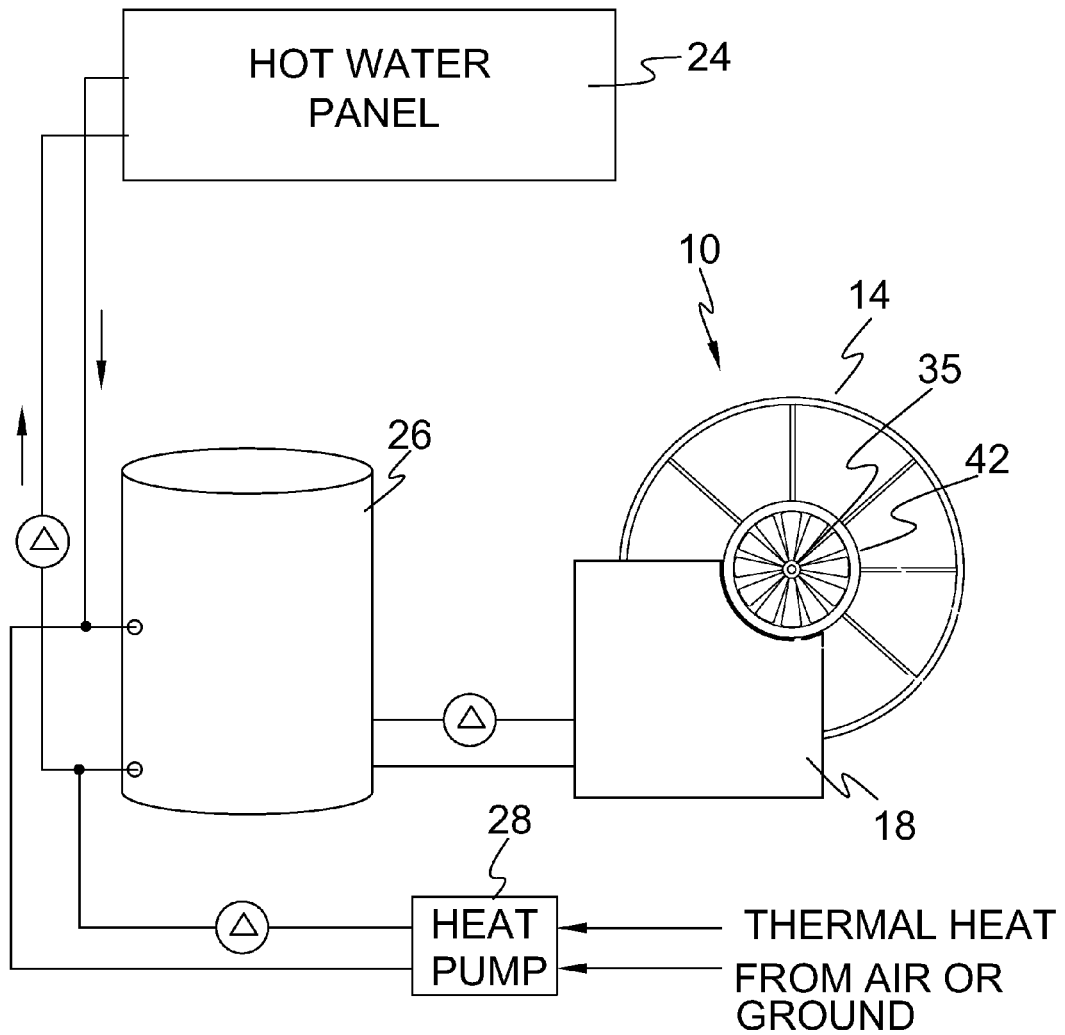
FIG. 3 is an illustrative view of the thermal torque engine of the present invention.

Referring to FIG. 3 is an illustrative view of torque engine of the present invention. Illustrated is another enablement of the torque engine 10 using naturally occurring thermal energy to heat the substantially enclosed space of the hot box 18, thereby creating a temperature difference between the canisters 16 within the hot box 18 and those outside of the hot box 18. Shown is the torque engine 10 using a hot water panel 24 and insulated hot water storage tank 26 to heat the water that is then circulated to and from the hot box 18. Also shown is the torque engine 10 using thermal heat from air or ground and a heat pump 28, thereby creating a temperature difference between the interior and exterior of the hot box 18.

Figure 4:
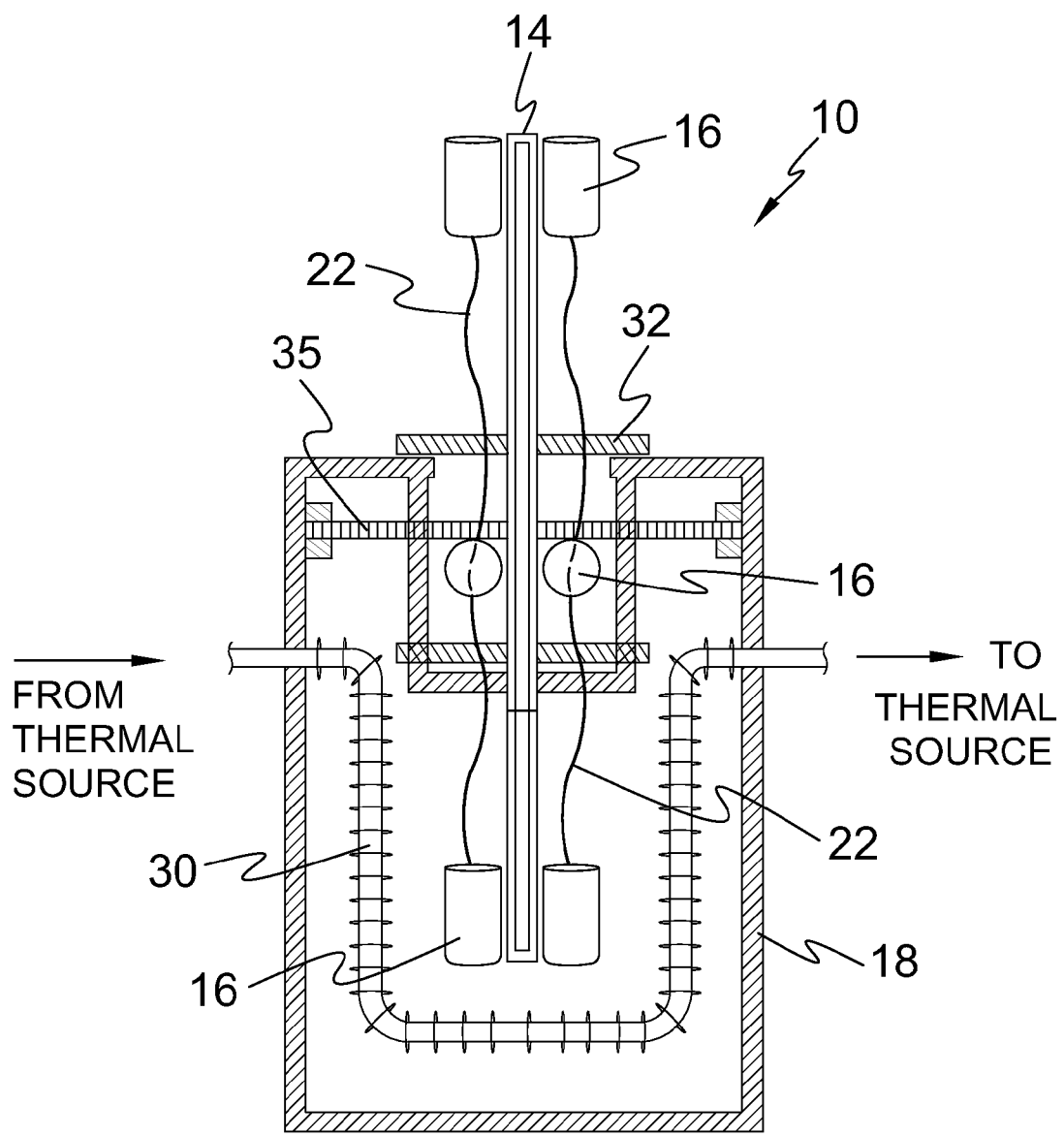
FIG. 4 is an illustrative sectional view of the thermal torque engine of the present invention.

Referring to FIG. 4 is an illustrative sectional view of the torque wheel of the present invention. The working fluid 20 within a pair of connected canisters 16 moves from the canister 16 within the hot box 18 to its opposing canister 16 outside of the hot box 18 by virtue of the temperature/pressure differential between the canisters 16 resulting in a weight differential between the canisters 16 causing the wheel 14 to turn. The thermal engine 10 of the present invention alternately provides for other heat sources, such as wood, gas, propane, etc. delivered via a hydronic heating system of radiators 30 inside the hot box 18. Furthermore, the hot box exterior canisters 16 can be cooled by ambient air or water. The spoke opening in the hot box 18 is sealed via rubber or cloth collar gasket ring 32 and rides against the top of the hot box 18. The canisters 16 enter and exit through double flap doors 34 located in the bottom entrance and the top exit of the hot box 18. The wheel 14 has an axle 35 that rotates within the hot box 18.

Figure 5:
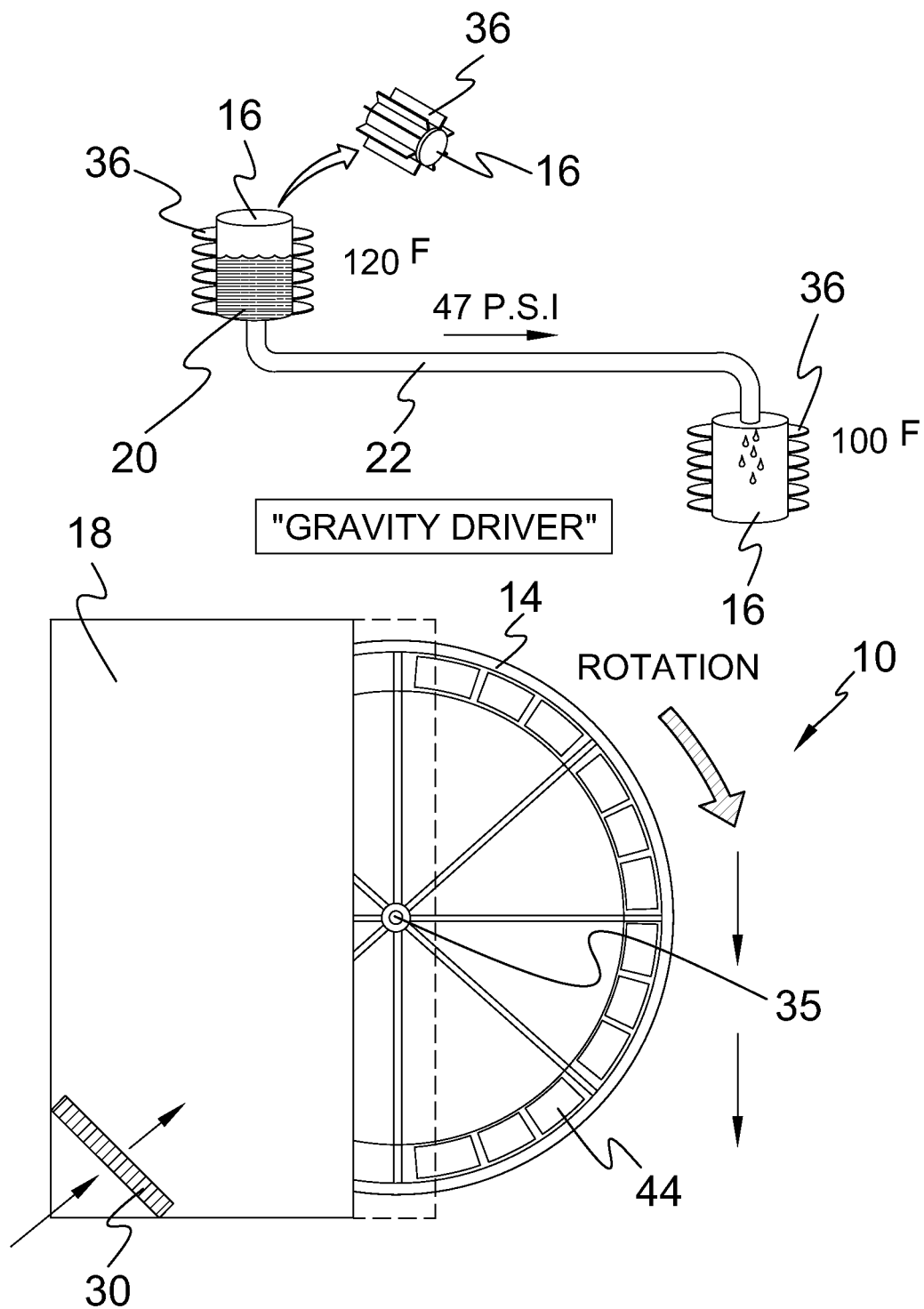
FIG. 5 is an illustrated view of the thermal torque engine.

Referring to FIG. 5 is an illustrated view of the thermal engine. The "minion cans" or canisters 16 have heat sinks, thermal surface enhancements, or fins 34 attached to facilitate heating and cooling. The speed and movement of the wheel 14 is determined by the temperature difference between the ambient air and hot box 18. Gravity and inertia are also factors in the speed and movement of the wheel 14 along with the flow rate of the working fluid 20.

Figure 6:
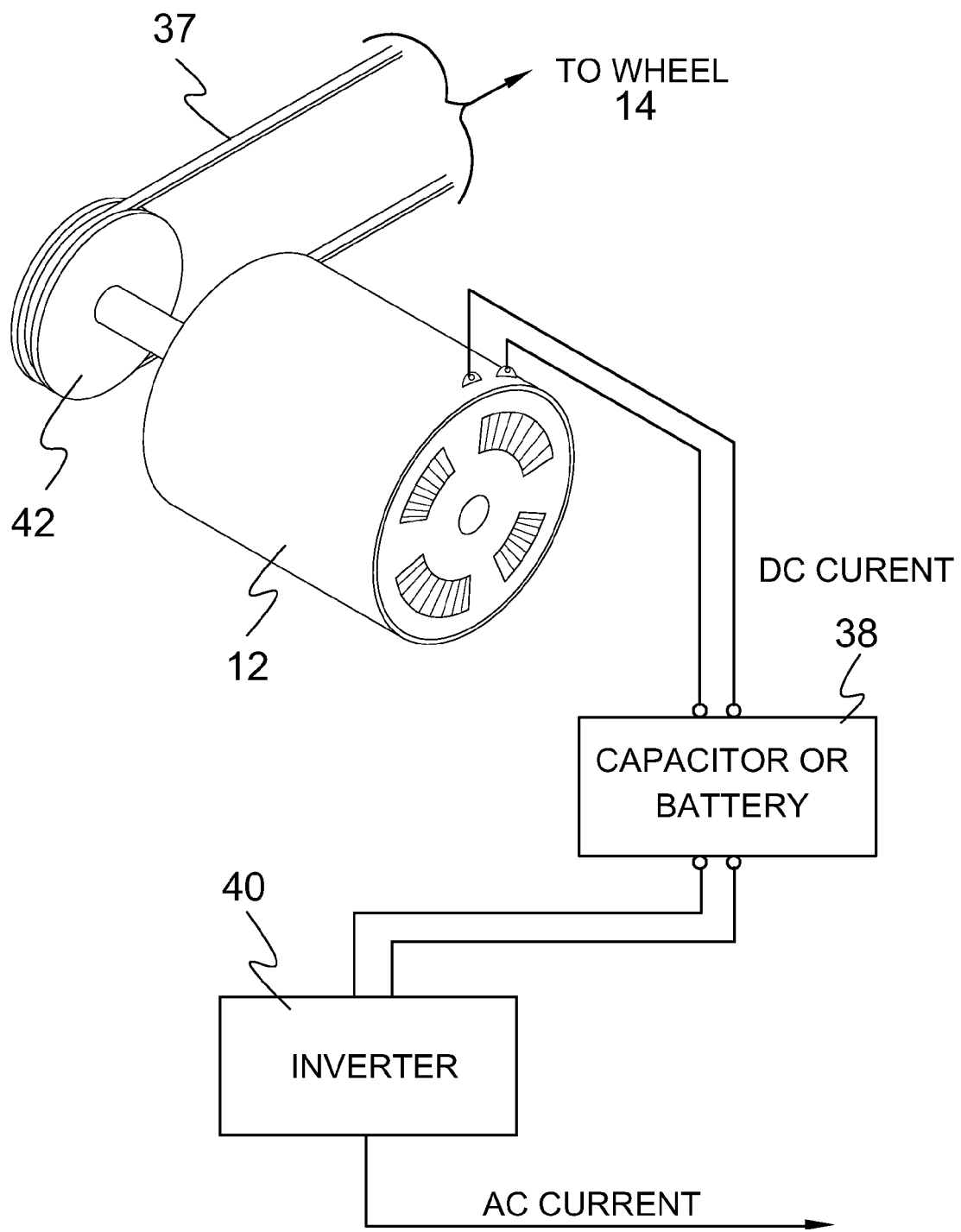
FIG. 6 is an illustrated view of electricity generation using the thermal torque engine.

Referring to FIG. 6 is an illustrated view of electricity generation using the torque engine. The wheel 14 generates torque, the torque is a motive force driving the alternator/generator 12 by a mechanical linkage, via a belt drive 37 between torque wheel 14 and alternator/generator 12 generating electricity that can be stored, via a capacitor or battery 38 or alternately via a thermal hot water storage tank 26, until needed or synchronized through an inverter 40 back into the power or grid used directly on site. The proper rpm will be obtained by the use of one or more pulleys 42 to obtain the desired gear ratio and rpm.

Figure 7:
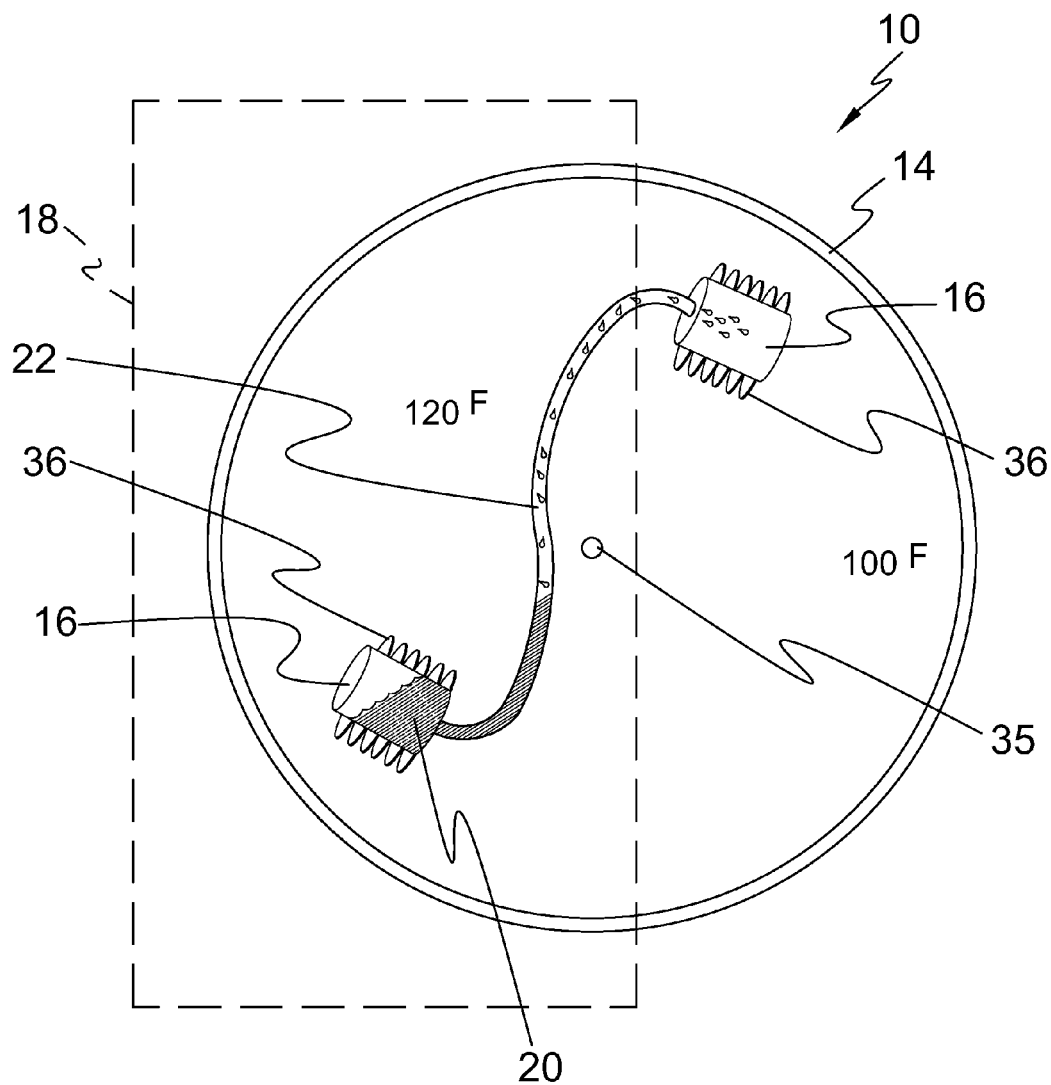
FIG. 7 is an illustrated view of the thermal torque engine of the present invention.

Referring to FIG. 7 is an illustrated view of the thermal wheel of the present invention. The sister set of canisters 16 are mounted to the wheel 14. The canister 16 within the hot box 18 is heated, causing the heated refrigerant 20 to increase in pressure forcing the liquid refrigerant 20 into the cooler canister 16 outside the hot box 18 (thermal energy transfer) causing the wheel 14 to turn by virtue of the thermal fluid transfer and shifting of weight, whereby the cooler refrigerant 20 enters the hot box 18 thereby again heating the refrigerant 20 that moves to the cooler canisters 16, with this process continuing as long as there is a predetermined thermal difference between the inside and outside of the hot box 18.

Figure 8:
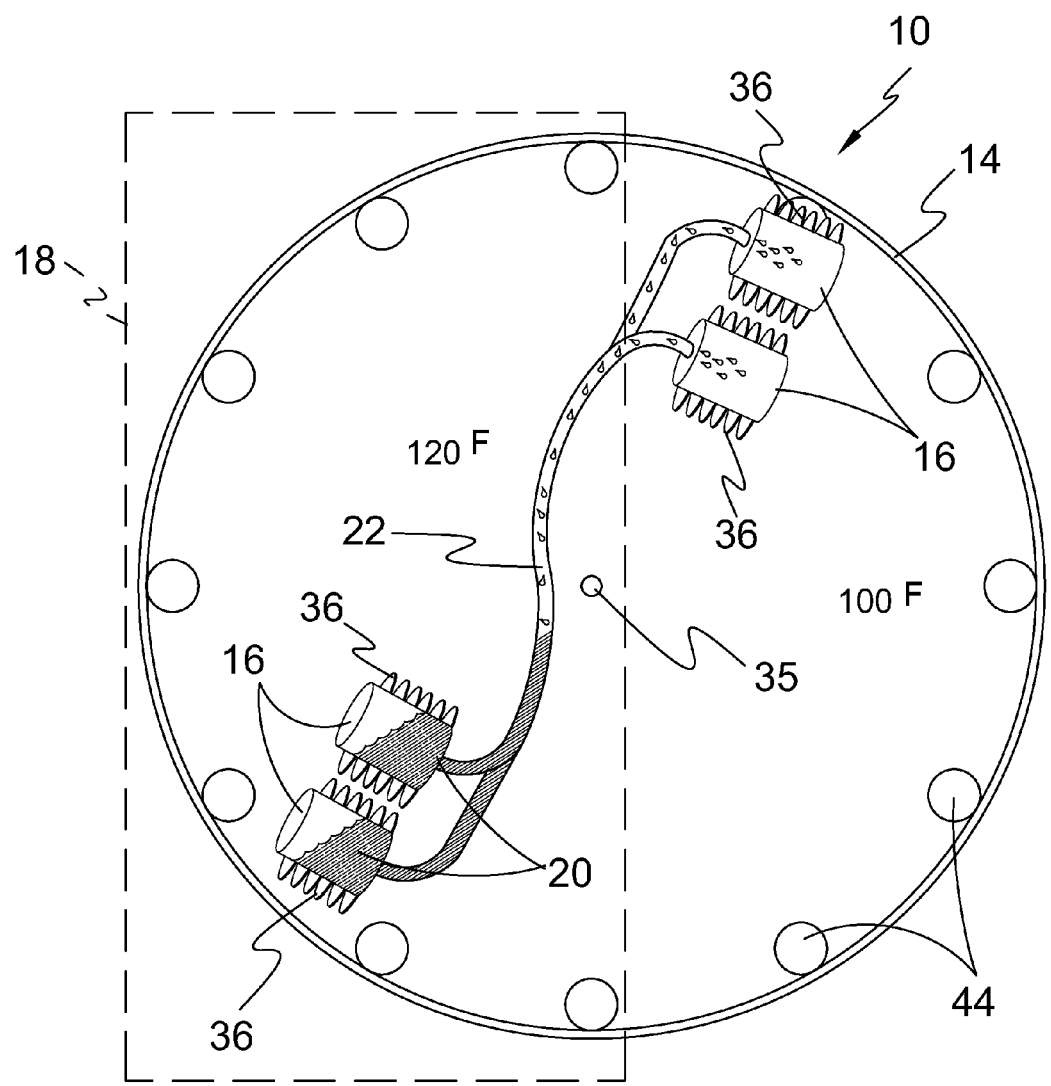
FIG. 8 is an illustrated view of an additional element of the thermal torque engine of the present invention.

Referring to FIG. 8 is an illustrated view of an additional element of the thermal wheel of the present invention. Illustrated is a pair of canisters 16 in fluid communication with a second pair of canisters 16 with each pair mounted to the wheel 14. The pair of canisters 16 within the hot box 18 are heated causing the heated refrigerant 20 to increase in pressure forcing the liquid refrigerant 20 into the cooler pair of sister canisters 16 outside the hot box 18 (thermal energy transfer) causing the wheel 14 to turn by virtue of the thermal fluid transfer and shifting of the liquid weight, whereby the cooler refrigerant 20 enters the hot box 18, thereby again heating the refrigerant 20 that moves to the cooler canisters 16 with this process continuing as long as there is a predetermined thermal difference between the inside and outside of the hot box 18. Further envisioned is mixing and/or bonding the refrigerant 20 with a heavier than refrigerant component that moves or washes with the working fluid.

Figure 9:
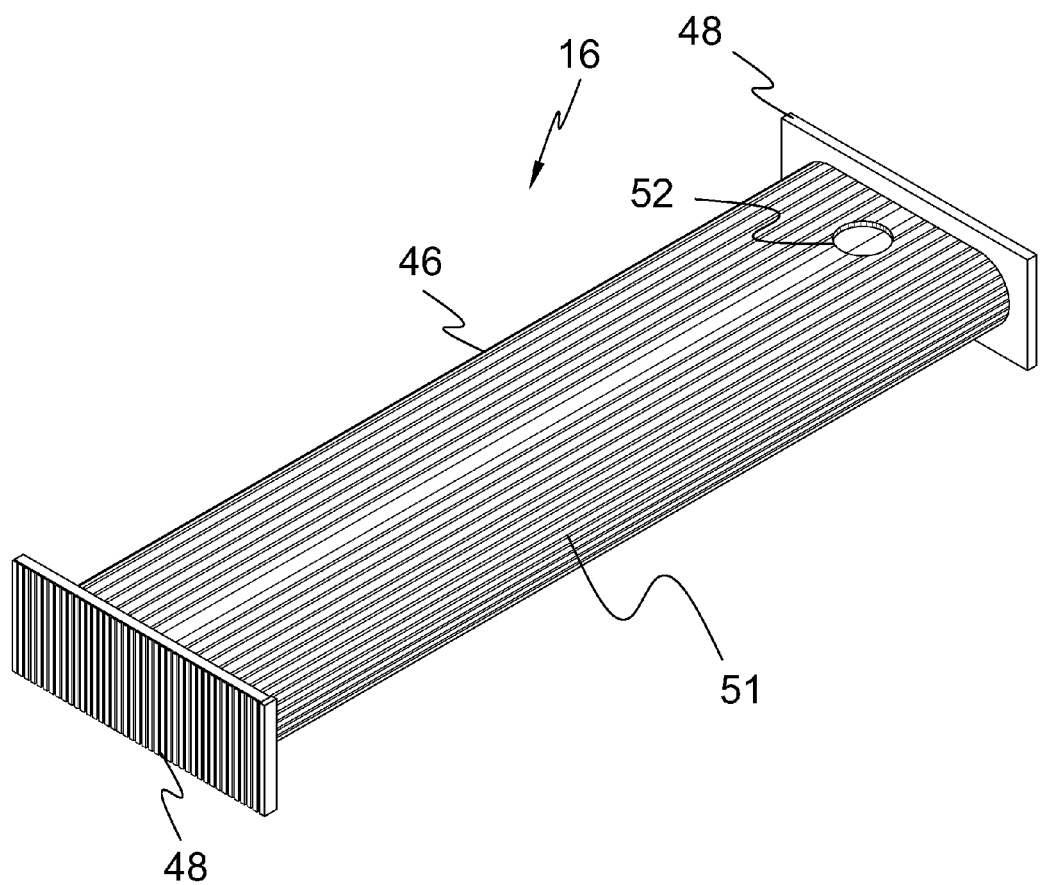
FIG. 9 is an assembled view of the alternate canister enablement of the thermal torque engine of the present invention.
Figure 10:
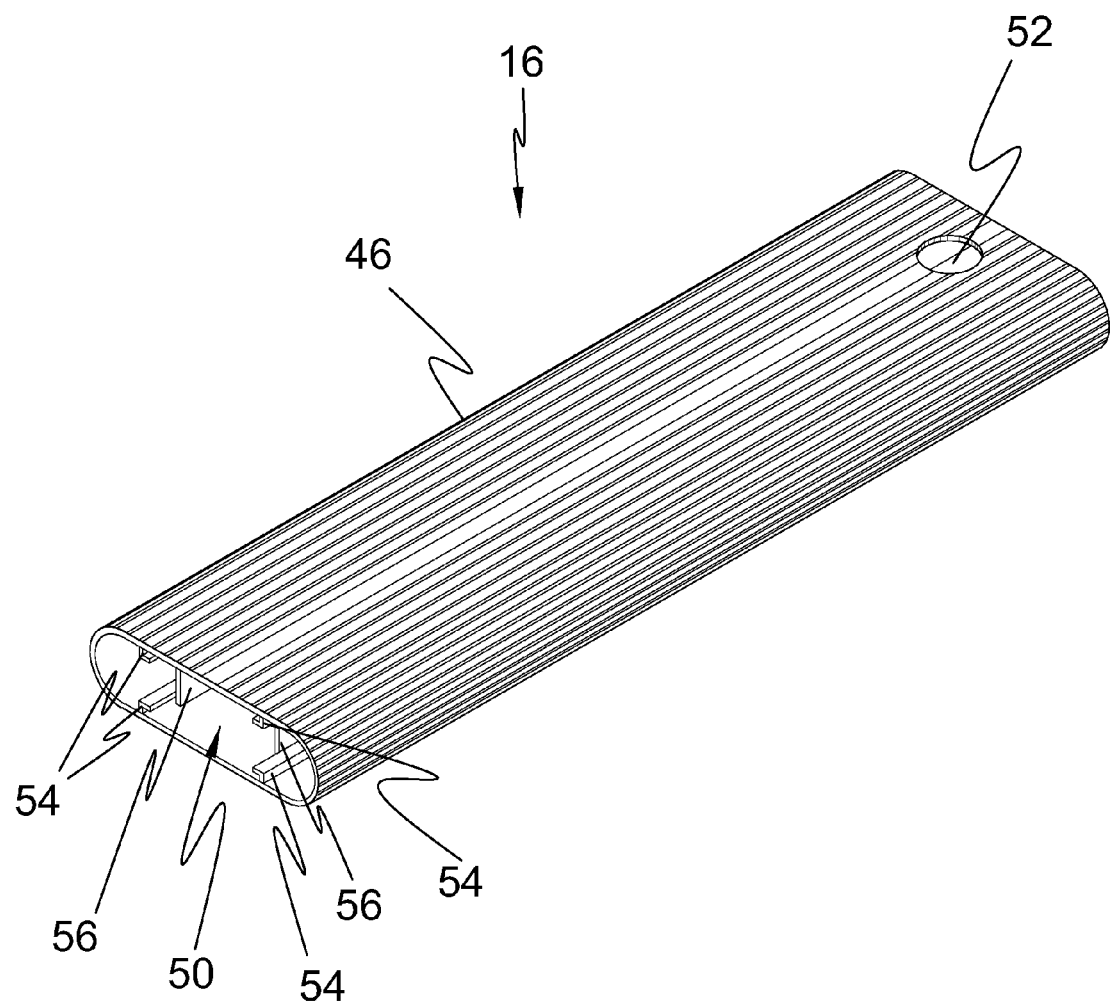
FIG. 10 is a sectional view of the alternate canister enablement of the thermal torque engine of the present invention.
Figure 11:
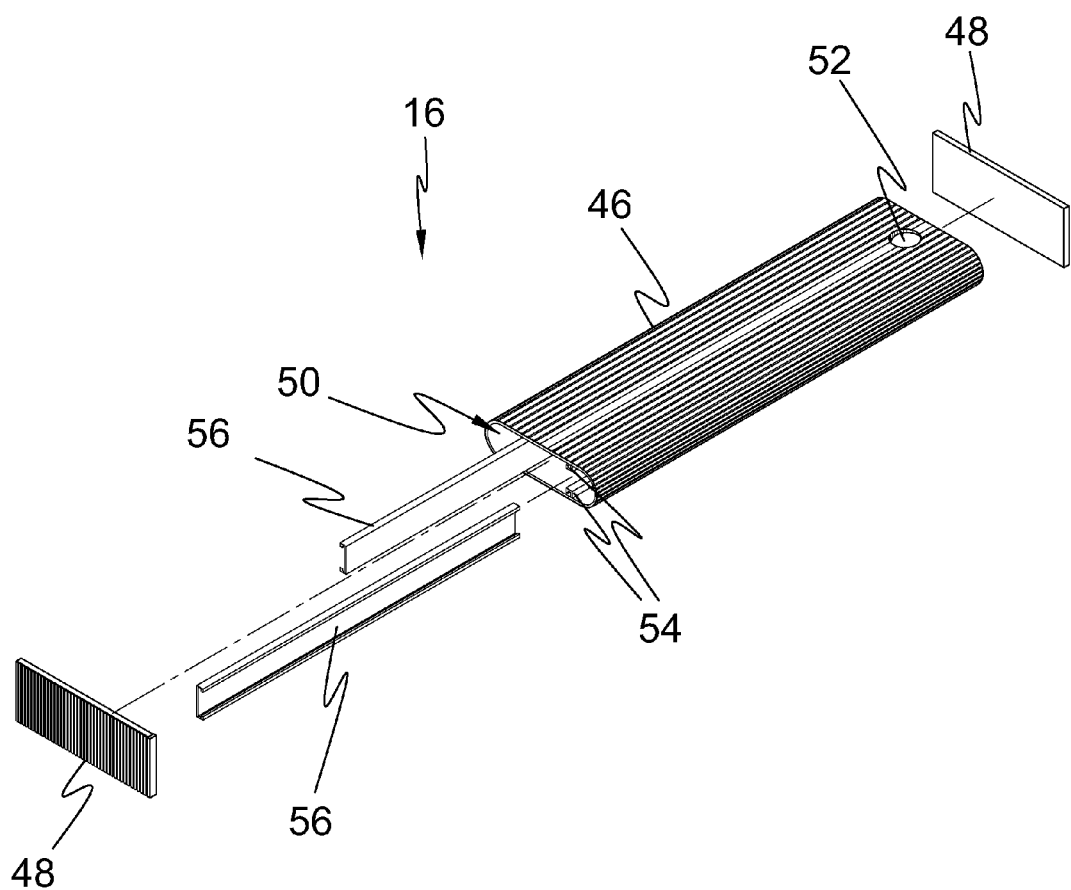
FIG. 11 is an exploded view of the alternate canister enablement of the thermal torque engine of the present invention.

Referring to FIG. 9 through FIG. 11, shown is an alternate enablement of the canister of the present invention. FIG. 9 depicts an assembled view of the alternate canister enablement where the canister 16 has chambers 50 within housing 46 and covers 48 with housing aperture 52 serving as ingress and egress port for the conduit movement of refrigerant 20. FIG. 10 is a sectional view of the alternate enablement of the engine canister without the end covers showing housing 46 having a plurality of chambers 50 formed by sliding fins 56 matingly engaging sliding fin channels 54. FIG. 11 is an exploded view of the alternate enablement of the engine canister 16 with the covers 48 removed showing the housing 46 having chambers 50. Also shown are sliding fin channels 54 forming a seat for sliding fin structural supports 56 that can also serves as a heat transfer mechanism. The sliding fin channels 54 and structural supports 56 have matingly engageable flanges.

Figure 12:
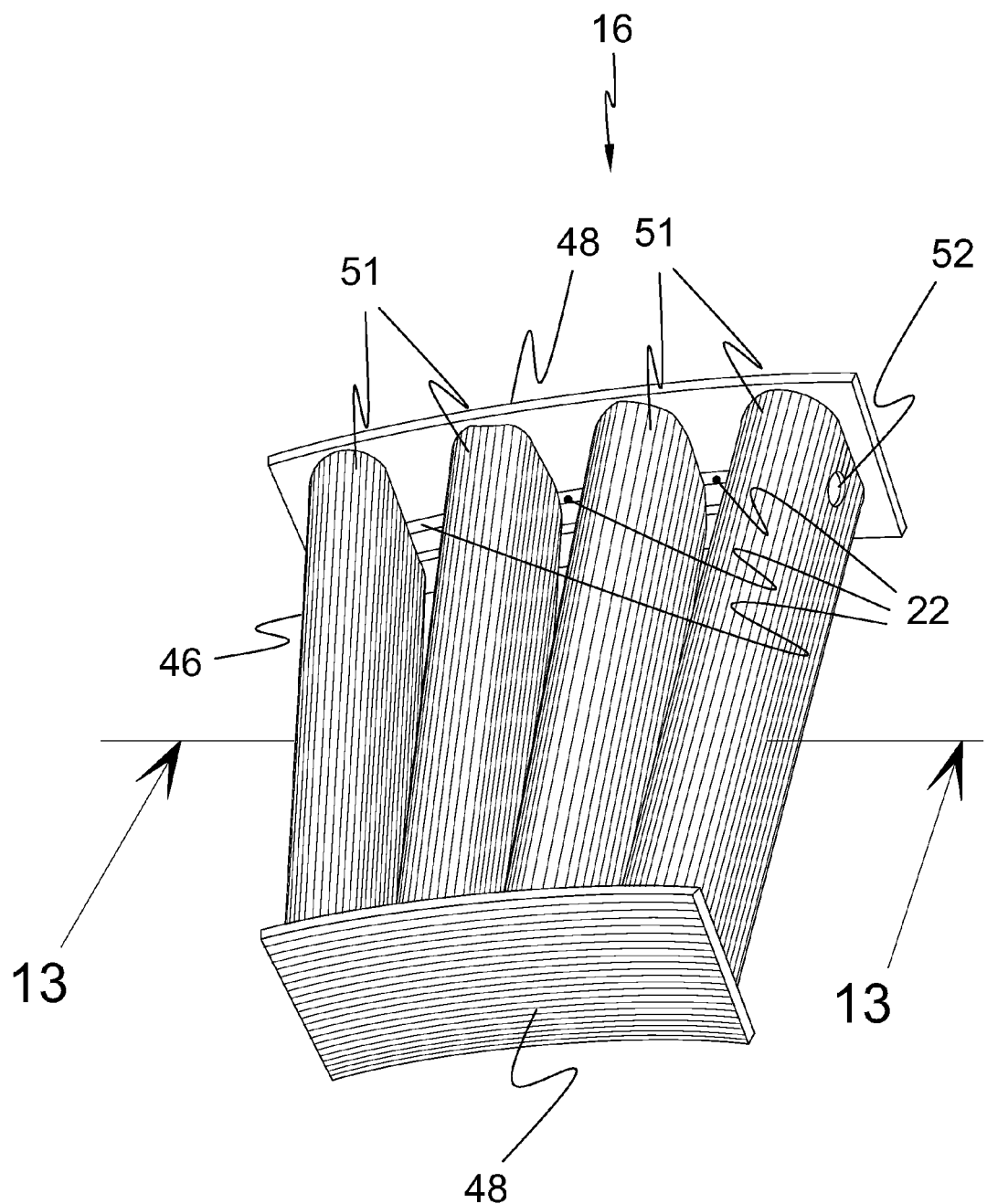
FIG. 12 is an illustrated view of an alternate multi-chambered canister of the thermal torque engine of the present invention.
Figure 13:
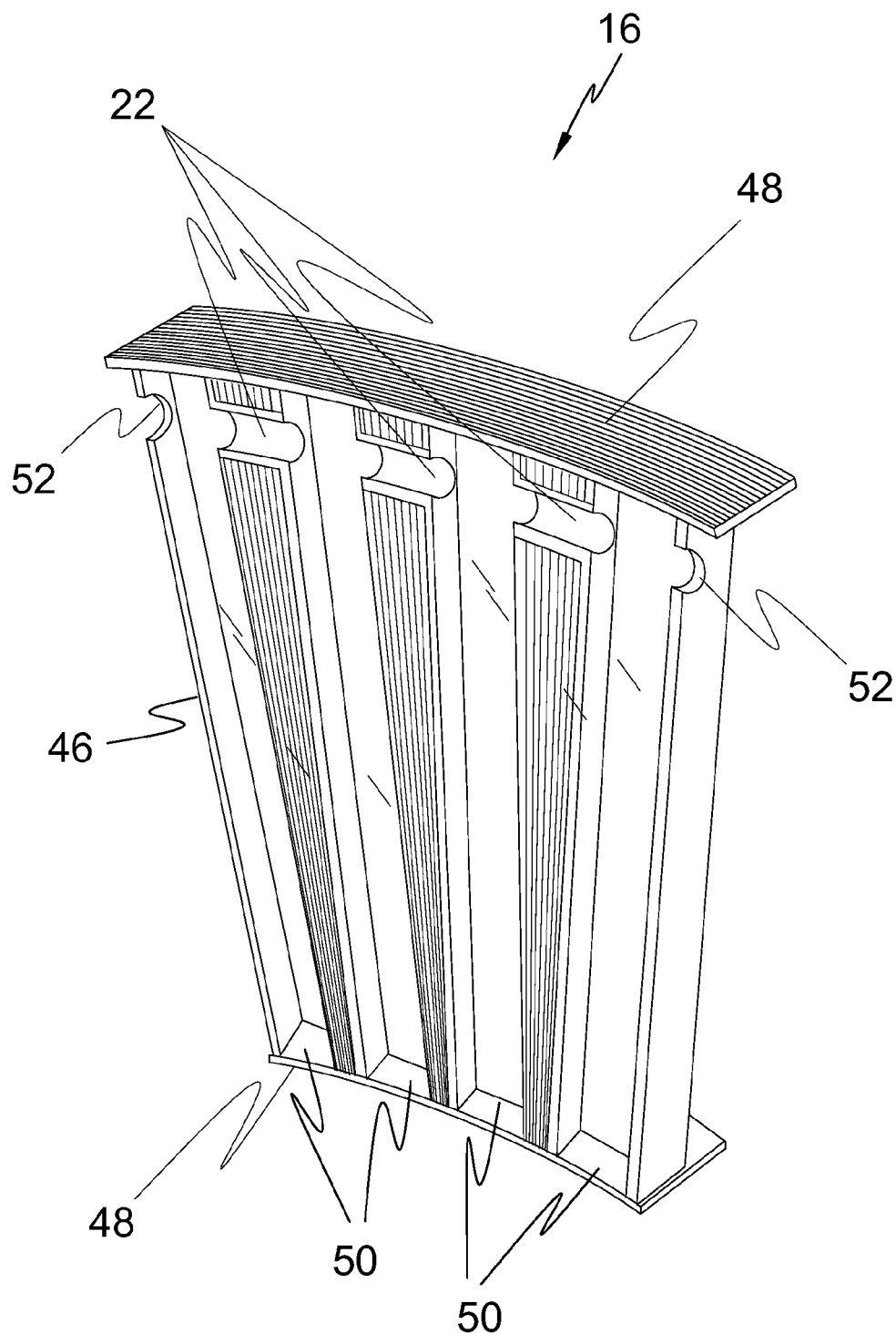
FIG. 13 is a cross sectional view taken along 13-13 of FIG. 12 of an alternate multi-chambered canister of the thermal torque engine of the present invention.

Referring to FIG. 12 through FIG. 13, shown is an alternate multi-chambered canister of the thermal torque engine of the present invention. The housing 46 comprises a plurality of conjoined chambers 50 between top and bottom covers 48, as shown in FIG. 12, with ingress and egress ports 52 for the movement of refrigerant 20. The plurality of spaced apart chambers 50 have ribbed heat enhanced thermal transfer covers 48, shown in FIG. 13, to enhance the thermal transfer between the thermal agent 20 and the canister 16.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A thermal torque engine comprising:
    a hot box heated by a thermal agent;
    a rotating wheel having a plurality of peripherally mounted canisters;
    said wheel mounted so that said hot box encloses a number of said canisters moving through said hot box;

a top exit door on said hot box for canisters moving out of said hot box being higher than a bottom inlet door on said hot box for canisters moving into said hot box;

wherein flap doors are located in the top exit and bottom inlet for said wheel to push through;

diametrically opposed canisters connected by a conduit forming a closed system between diametrically opposed canisters;

wherein the canisters include a plurality of interior chambers in which sliding fins matingly engaging sliding fin channels, each of said fins sliding in a separate channel extending from one end flat cover of the chamber to an opposite end flat cover thereof, and a conduit aperture for each canister located on a side of each canister adjacent one end flat cover thereof;

each pair of diametrically opposed canisters containing a quantity of refrigerant;

said thermal agent comprising a source of heat within said hot box to vaporize refrigerant within canisters passing therethrough causing vaporized refrigerant to move to the diametrically opposed cooler canister causing a shift in weight, causing wheel rotation, with the process continuing for subsequent paired canisters as long as there is a predetermined thermal difference between interior and exterior of the hot box.

2. The thermal torque engine is recited in claim 1, further comprising an alternator/generator driven through a mechanical linkage between the wheel and the alternator/generator to generate electricity.

3. The thermal torque engine as recited in claim 2, wherein the thermal energy is selected from naturally occurring thermal energy.

4. The thermal torque engine as recited in claim 2, wherein the thermal agent is selected from water, glycol and oil.

5. The thermal torque engine as recited in claim 1, wherein the hot box encloses a full lower quadrant of said wheel, which side quadrant depending on the direction of rotation of said wheel.

6. The thermal torque engine as recited in claim 1, wherein the hot box encloses a full side half of said wheel, which side depending on the direction of rotation of said wheel.

7. The thermal torque engine as recited in claim 1, wherein the hot box comprises a radiator channeling a thermal agent imbued with thermal energy as a heat source for heating the hot box.

8. The thermal torque engine as recited in claim 7, wherein the radiator comprises a surface enhancement comprising fins, to accelerate the heat exchange within the hot box.

9. The thermal torque engine as recited in claim 1, wherein each canister comprises a surface enhancement comprising fins or ribs, to dissipate and absorb the thermal energy of the canister.

10. The thermal torque engine as recited in claim 1, wherein the wheel comprises a plurality of stationary weights fastened to the periphery of the wheel to increase torque as the wheel turns.

11. The thermal torque engine as recited in claim 1 uses naturally occurring thermal energy to heat the thermal agent that is channeled through the hot box to heat the hot box.

12. The thermal torque engine as recited in claim 1, uses alternate fuels selected from the group consisting of wood, gas and propane to heat the thermal agent within the hot box.

* * * * *